Patented Jan. 9, 1951

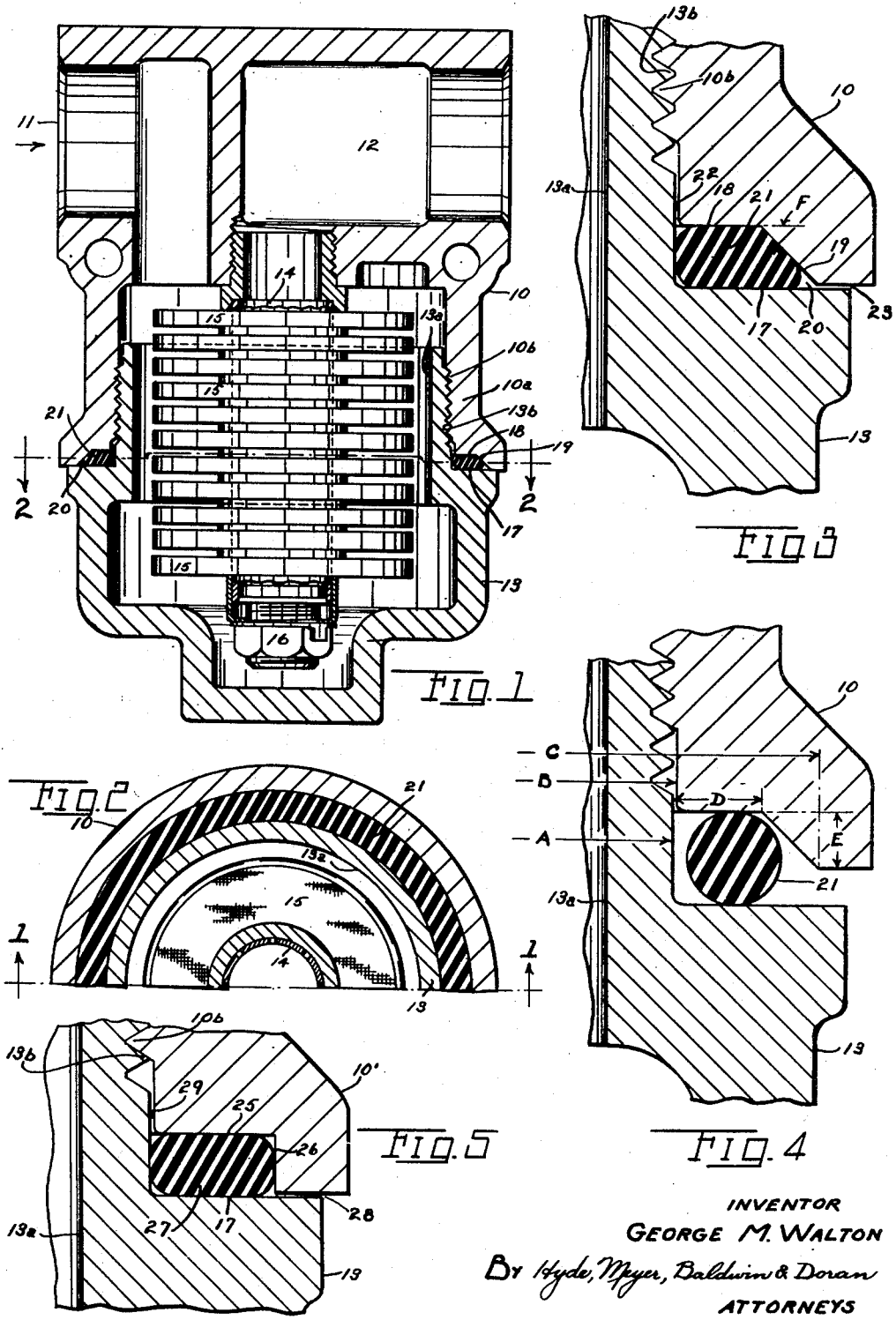

2,537,249

UNITED STATES PATENT OFFICE 2,537,249

O-RING SEAL

George M. Walton, Shaker Heights, Ohio, assignor to Air-Maze Corporation, Cleveland, Ohio, a corporation of Delaware Application May 29, 1947, Serial No. 751,295

3 Claims. (Cl. 285—157)

This invention relates to improvements in an O-ring seal between two interfitting sleeve-like parts which are drawn towards each other.

An object of the present invention is to provide an improved seal wherein two shoulders are drawn into engagement with each other, said shoulders enclosing between them an annular chamber generally trapezoidal in shape with a resilient O-ring compressed within said trapezoidal chamber but not completely filling the same.

Other objects and advantages of the present invention will be apparent from the accompanying drawings and description and the essential features thereof will be set forth in the appended claims.

In the drawings,

Fig. 1 is a central sectional view through a liquid filter housing taken along the line 1—1 of Fig. 2;

Fig. 2 is a transverse sectional view of the same taken along the line 2—2 of Fig. 1;

Fig. 3 is an enlarged sectional view of the right-hand portion of the seal shown in Fig. 1;

Fig. 4 is a view similar to Fig. 3 showing the parts of Fig. 3 separated before they are drawn together to complete the seal; while Fig. 5 is a sectional view similar to Fig. 3 showing a modified form of my device.

I have chosen to show my invention in connection with a liquid filter having a housing portion 10 open at the bottom and provided at the top with a liquid inlet passageway 11 and a liquid outlet passageway 12. A housing member 13 closes the bottom of the housing member 10. On a central perforated tube 14 are mounted a plurality of hollow filter leaves 15 secured in position by a nut 16 on the bottom of the tube 14. In the operation of this device dirty liquid enters at 11 flows through the hollow leaves 15 into the tube 14 and is discharged at 12. It is obvious that my invention has many other applications in industry.

Great difficulty is encountered in sealing the housing portions 10 and 13 at their annular meeting faces, especially where the liquid pressures encountered are of the order of one thousand pounds per square inch. I am aware that O-rings have been utilized for this purpose. In such cases the best rules of practice specify an inner sleeve having a cylindrical outer surface which is substantially mirror smooth. An outer sleeve is then fitted about the inner sleeve with a tolerance which is held to an absolute minimum. This outer sleeve is provided with a pocket having a wall parallel to the cylindrical surface of the inner sleeve and also mirror smooth. Such joints are very difficult to construct especially under conditions of mass production. I have discovered a manner of providing an O-ring seal between such interfitting sleeve parts which does not require close tolerances or mirror smooth finishes and yet which performs its desired function.

In the form shown I provide an outer sleeve 10a having an internal thread 10b. I also provide an inner sleeve 13a having an external thread 13b. The sleeve 13a is provided with a shoulder 17 extending radially outwardly in a plane at right angles to the axis of the sleeves. The sleeve 10a is provided with a shoulder having a portion 18 parallel to the shoulder 17 and a portion 19 outwardly therefrom which is inclined radially outwardly and toward the shoulder 17 at an angle F of approximately 45 degrees to the planes 17 and 18. When the two shoulders are drawn substantially into engagement they enclose between them an annular chamber 20 generally trapezoidal in cross-sectional area as shown in Figs. 1 and 3.

Before the shoulders are drawn together when the parts are in the position of Fig. 4, I place an O-ring 21 of resilent rubberlike material between the shoulders. Preferably, I choose the O-ring with such an internal diameter that it does not touch the sleeve 13a when the ring is in unstressed position as shown in Fig. 4. I also choose the O-ring so that its cross-sectional area in unstressed condition as shown in Fig. 4 is less than the trapezoidal area of the chamber 20 as shown in Fig. 3. Preferably, the cross-sectional area of the O-ring is of the order of 75 to 95 percent of the area of the trapezoidal chamber.

It results from the above construction that when the parts are drawn together as shown in Fig. 3 the O-ring is squeezed into engagement with the shoulder portions 17, 18 and 19. Note that none of the material of the O-ring is squeezed into the space 22 of Fig. 3 between the inner and outer sleeves as is customary in O-ring seals of this character known to me. Also note that any internal pressure exerted against the O-ring will squeeze the same more tightly between the converging surfaces 17 and 19 as shown in Fig. 3 so as to seal the joint more tightly.

Referring to Fig. 4, in one embodiment of my invention the diameter A is held within a tolerance of 2.99 inches to 3.00 inches. The diameter B is held within a tolerence of 3.015 inches to 3.025 inches. The diameter C is held within a tolerance of 3.685 inches to 3.700 inches. The dimension B is held within a tolerance of .196 inch to .215 inch. The dimension E is held to a tolerance of .140 inch to .146 inch. It will be noted that none of these tolerances are the "absolute minimum" now held to be necessary in standard O-ring seals. Using the above mentioned tolerances it will be found that the trapezoidal area of the chamber 20 will range from .0372 square inch minimum to .0420 square inch maximum. A standard O-ring for this purpose will have a minimum diameter of .205 inch corresponding to a cross-sectional area of .0330 square inch and a maximum diameter of .215 inch corresponding to an area of .0360 square inch. From the above figures it may be calculated that if an O-ring of minimum cross-sectional area is squeezed into a trapezoid 20 of maximum cross-sectional area, the O-ring will fill about 78 percent of the area of the trapezoid. On the other hand if an O-ring of maximum cross-sectional area is squeezed into a trapezoidal chamber 20 of minimum cross-sectional area, the O-ring will take up approximately 96 percent of the trapezoidal area. Stated in another way, it is usual in standard O-ring seals used prior hereto to squeeze the O-ring approximately ten thousandths of an inch on the cross-sectional diameter of the O-ring. With my improved seal and using the dimensions given above it will be noted that the O-ring is squeezed .059 inch to .075 inch depending on the combination of maximum and minimum tolerances.

To show the tremendous pressures involved, my improved seal has been forced apart at the plane 23 indicated in Fig. 3 a distance of two thousandths of an inch under an internal liquid pressure of one thousand pounds per square inch.

Another advantage of my seal over a standard O-ring seal as used heretofore is connected with the circumstance that prior O-ring seals known to me have squeezed a portion of the O-ring into the space 22 indicated in my drawing at Fig. 3 when the seal was in use. Under these conditions of the prior art the movement of the resilient O-ring material up and down in the space 22 toward and away from the engaged threads 10b and 13b, under conditions of fluctuating pressure, caused a pumping action which eventually pumped liquid through the threads and out through the sealed joint. Under conditions met with where the hazard from fire is very great as for instance in the aviation industry, the slightest leakage of oil through the seal is objectionable. My improved seal has withstood such rigid tests even under a thousand pounds per square inch internal liquid pressure.

In Fig. 5 I have shown another form of my device which is operative although not as effective as the first described form. Here the part 13, the threads 13b and the shoulder 17 are the same as before. The part 10' has threads 10b which engage with the threads 13b exactly as previously described. The only change in this modification is the provision of a shoulder 25 on the member 10' substantially parallel to the shoulder 17 and a shoulder or recess portion 26 extending from the outer edge of the shoulder portion 25 toward the shoulder 17 and substantially meeting the shoulder 17. In this form the sleeve 13a and the shoulder portions 17, 25 and 26 substantially enclose an annular recess which is generally rectangular in cross-section. The O-ring 27 occupies this recess and when the parts 13 and 10' meet at the plane 28 the O-ring is substantially compressed in the rectangular recess but does not fill that recess. It results from this construction that when pressure is applied inside the housing this pressure is exerted against the O-ring through the passageway 29 and squeezes the O-ring more tightly against the confining shoulder portions giving a good sealing action.

It should be noted that in both forms of my device the O-ring is placed under considerable compression when the parts are first assembled and before any pressure is applied inside the housing. This pre-stressing is definitely limited when the parts 10 and 13 meet at the plane 23 or in the modification of Fig. 5 when the parts 10' and 13 meet at the plane 28. There is thus a definite compression of the O-ring which places the parts in the best condition to give a highly efficient sealing action when a great pressure differential is created between the inside and the outside of the liquid-containing housing.

What I claim is:

1. Sealing structure comprising an outer sleeve having an inside thread, an inner sleeve having an outside thread adapted to securingly engage said inside thread, each of said sleeves having outwardly extending annular shoulders adapted to be brought together by operation of said threads, one of said shoulders extending radially outwardly in a plane at right angles to the axis of its associated sleeve, the other of said shoulders having a portion substantially parallel to said one shoulder adjacent its associated sleeve and having a portion radially outwardly from said parallel portion inclined radially outwardly and toward said one shoulder to a point substantially touching said one shoulder when said threads are engaged sufficiently to bring the outer portions of said shoulders substantially together, and an annular O-ring of resilient material compressed between said shoulders when the latter are so drawn together, said O-ring having a cross-sectional area, measured radially, less than the cross-sectional area included between said one shoulder on the one hand and said parallel and inclined portions of said other shoulder on the other hand, both measured radially.

2. Sealing structure comprising outer and inner cylindrical sleeves having telescoping diameters within a tolerance of the order of twenty thousandths of an inch, shoulders on said sleeves extending radially outwardly from the cylindrical portions thereof, means for drawing said shoulders substantially into engagement under pressure, there being coacting surfaces on said shoulders enclosing an annular chamber generally trapezoidal in radial cross-section, said trapezoid having parallel sides at right angles to the axes of said sleeves and having an end nearer said sleeves at right angles to said parallel sides and having an outer end inclined outwardly and toward the meeting shoulders, and an O-ring of rubber-like material in said chamber, the cross-sectional area of said O-ring being of the order of seventy-five to ninety-five per cent of the cross-sectional area of said trapezoid.

3. Sealing structure comprising an outer sleeve having an inside thread, an inner sleeve having an outside thread adapted to securingly engage said inside thread, each of said sleeves having outwardly extending annular shoulders adapted to be brought together by operation of said threads, one of said shoulders extending radially outwardly in a plane at right angles to the axis of its associated sleeve, the other of said shoulders having a portion substantially parallel to said one shoulder adjacent its associated sleeve and having a portion radially outwardly from said parallel portion inclined, at an angle of approximately forty-five degrees to said parallel portion, radially outwardly and toward said one shoulder to a point substantially touching said one shoulder when said threads are engaged sufficiently to bring the outer portions of said shoulders substantially together, and an annular O-ring of resilient material compressed between said shoulders when the latter are so drawn together.

GEORGE M. WALTON.

REFERENCES CITED

The following references are of record in the file of this patent:

UNITED STATES PATENTS

| Number | Name | Date |
|---|---|---|
| 1,365,151 | Burke | Jan. 11, 1921 |
| 2,110,825 | Archer | Mar. 8, 1938 |
| 2,343,235 | Bashark | Feb. 29, 1944 |